(12) United States Patent
Ohashi et al.

(10) Patent No.: US 7,068,333 B2
(45) Date of Patent: Jun. 27, 2006

(54) LIQUID CRYSTAL DISPLAY WITH PHOTODETECTORS HAVING POLARIZING PLATES MOUNTED THEREON AND ITS CORRECTING METHOD

(75) Inventors: Mitsuo Ohashi, Tokyo (JP); Katsue Ueda, Osaka (JP)

(73) Assignee: Eizo Nanao Corporation, Ishikawa (JP)

( * ) Notice: Subject to any disclaimer, the term of this patent is extended or adjusted under 35 U.S.C. 154(b) by 0 days.

(21) Appl. No.: 10/492,748

(22) PCT Filed: Oct. 16, 2001

(86) PCT No.: PCT/JP01/09062

§ 371 (c)(1),
(2), (4) Date: Apr. 14, 2004

(87) PCT Pub. No.: WO03/034131

PCT Pub. Date: Apr. 24, 2003

(65) Prior Publication Data

US 2004/0246434 A1    Dec. 9, 2004

(51) Int. Cl.
*G02F 1/1335* (2006.01)
*F21V 7/04* (2006.01)

(52) U.S. Cl. .................... 349/68; 349/61; 349/96; 362/611

(58) Field of Classification Search .............. 349/199
See application file for complete search history.

(56) References Cited

U.S. PATENT DOCUMENTS

| 3,963,312 A | * | 6/1976 | Wild ........................ 349/97 |
| 5,933,089 A | * | 8/1999 | Katada ..................... 340/7.55 |
| 6,301,047 B1 | * | 10/2001 | Hoshino et al. ............ 359/566 |

FOREIGN PATENT DOCUMENTS

| EP | 0 493 893 A2 | | 7/1992 |
| EP | 0 586 198 A1 | | 3/1994 |
| JP | 02018520 | | 1/1990 |
| JP | 05289056 | | 11/1993 |
| JP | 05289056 A | * | 11/1993 |
| JP | 07064057 | | 3/1995 |
| JP | 07064057 A | * | 3/1995 |
| JP | 07036132 | | 7/1995 |
| JP | 08054859 | | 2/1996 |
| JP | 11282404 | | 10/1999 |

\* cited by examiner

*Primary Examiner*—Andrew Schechter
*Assistant Examiner*—W. Patty Chen
(74) *Attorney, Agent, or Firm*—David N. Lathrop, Esq.; Gallagher & Lathrop

(57) ABSTRACT

The quantity of light from a backlight is monitored by a first photodetector, and the environment on the part of a user is monitored by a second photodetector disposed in the rear of a liquid crystal panel, not on the front thereof. It is possible to exclude the influence of external light from the user side on the first photodetector which detects the quantity of light from the backlight.

4 Claims, 10 Drawing Sheets

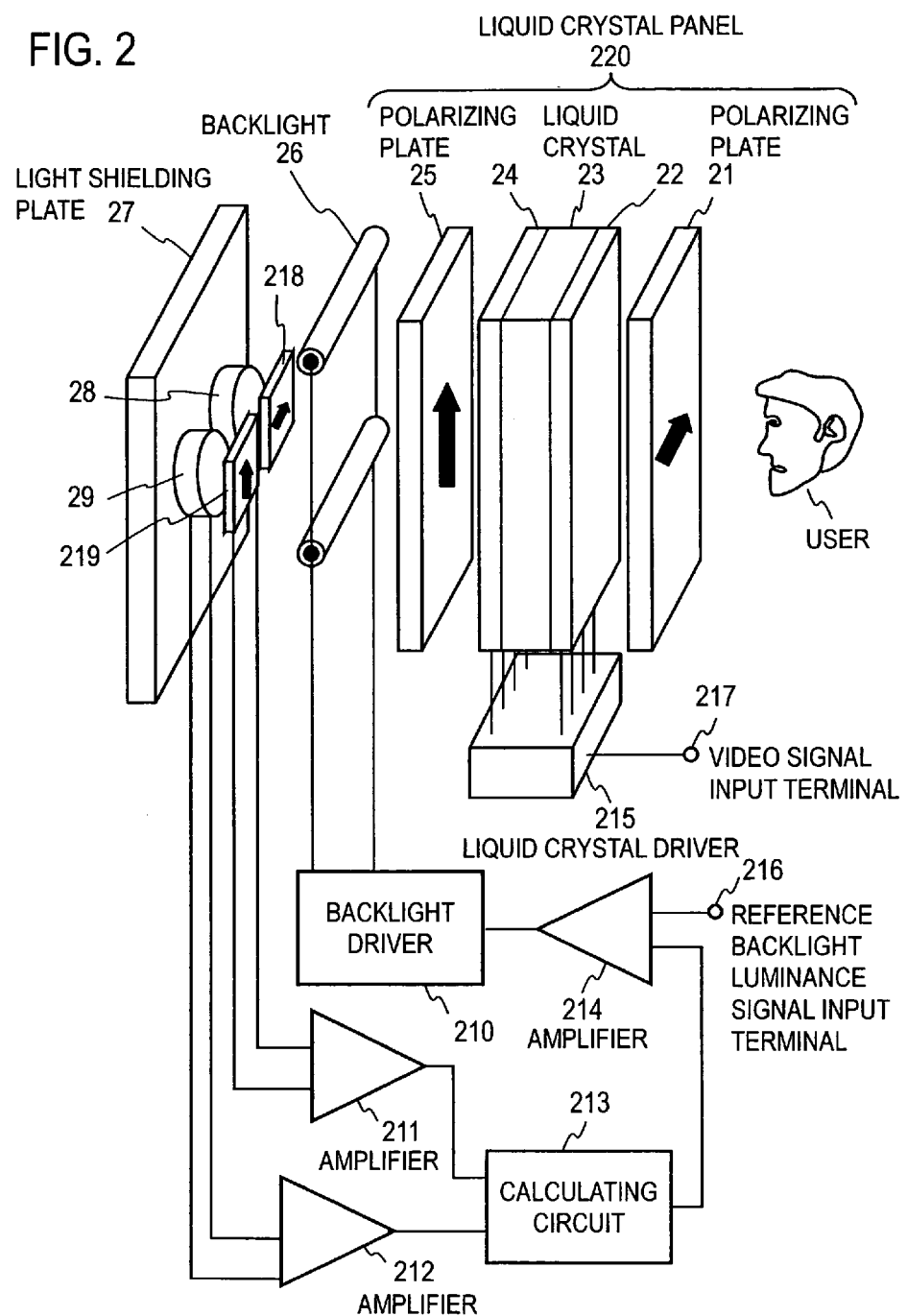

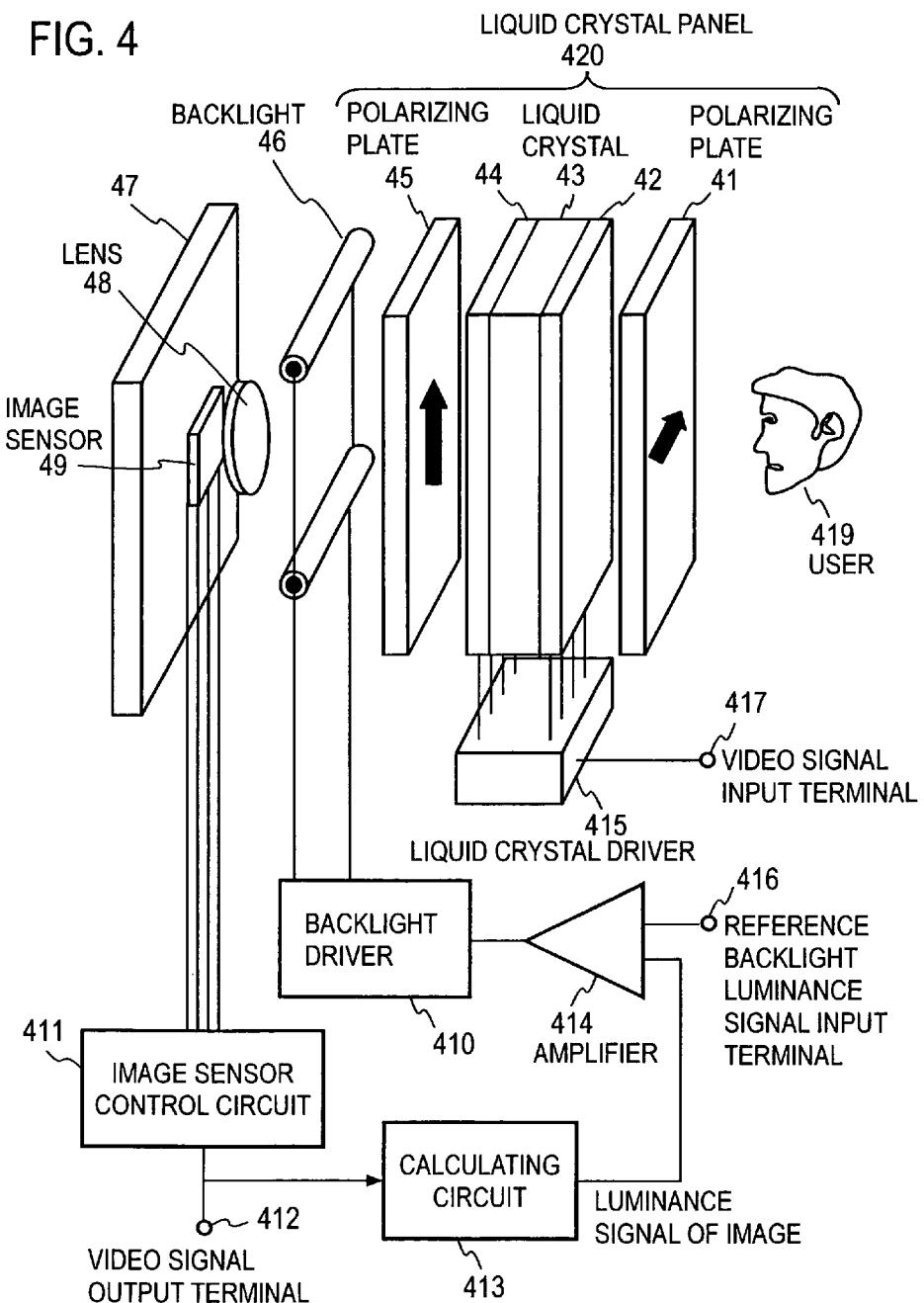

WITH HORIZONTALLY POLARIZING PLATE INSTALLED

WITH VERTICALLY POLARIZING PLATE INSTALLED

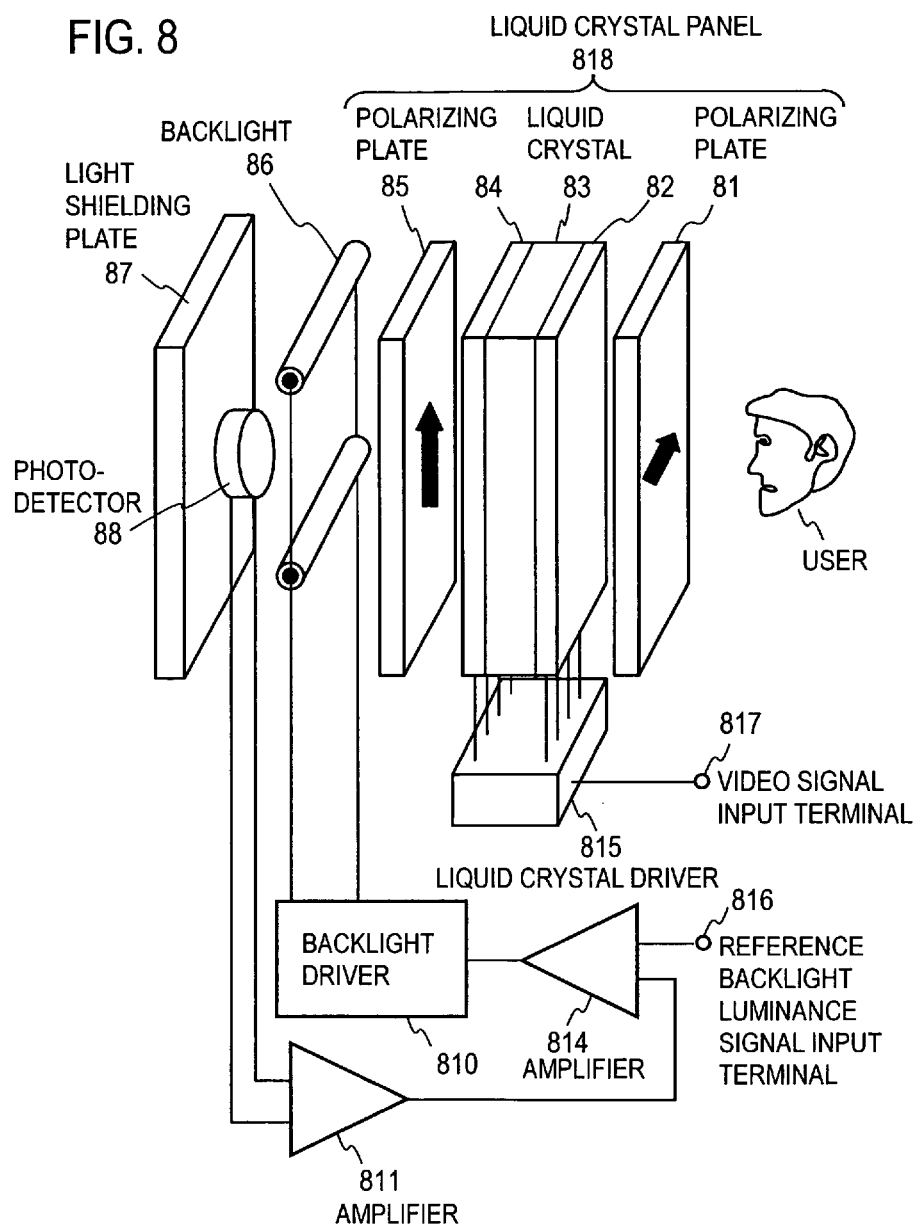

LIQUID CRYSTAL DISPLAY WITH PHOTODETECTORS HAVING POLARIZING PLATES MOUNTED THEREON AND ITS CORRECTING METHOD

TECHNICAL FIELD

The present invention relates to a technique for implementing a liquid crystal display equipped with functions of controlling the quantity of light from a backlight with high precision and capturing information about user image in front of the liquid crystal display screen and about the illuminance on the display screen and a technique of calibrating the display with high-level gray scale.

BACKGROUND ART

In recent years, liquid crystal displays have come into wide use in home TVs, computers, picturephones, and so forth. Such liquid crystal displays are mostly backlight displays. Since the reproducibility of image is needed especially in the fields of printing, medical care, etc., it is customary in the art to monitor the quantity of light from the backlight by a photodetector placed in the rear of the liquid crystal display and control the backlight accordingly. Since the light transmission characteristic of the liquid crystal panel greatly varies nonlinearly with working temperature and due to age deterioration, there is a limit to enhancement of the gray scale from the practical point of view. Further, there have also been developed liquid crystal displays provided with means for monitoring a user image and illuminance in the use environment, but in many cases an image sensor or photodetector is disposed behind or beside the display screen, or a manual sensor is mounted on the display screen for manual calibration.

However, in the case of monitoring the quantity of light from the backlight by the photodetector mounted in the liquid crystal display as in the prior art, there arises a problem that no appropriate monitoring of the quantity of light is possible since the amount of light reflected rearwardly of the liquid crystal panel differs depending on whether the liquid crystal is transparent to light or not. Furthermore, depending on whether ambient brightness is high or low, the incidence of external light from the front of the liquid crystal panel disturbs monitoring by the photodetector, sometimes hindering appropriate luminance control of the backlight. It is also necessary to monitor the illuminance in the use environment. The photodetector or image sensor mounted on the front of the liquid crystal display for monitoring the illuminance and the user image in the use environment ruins the appearance of the display. Besides, since the optical transfer characteristic of the liquid crystal panel changes with aging or temperature, reproducibility of the gray scale of image may sometimes lower even if the quantity of light from the backlight is controlled to be constant; hence, it is to be wished that a high-precision calibration scheme be established.

DISCLOSURE OF THE INVENTION

The liquid crystal display of the present invention is provided with a photodetector for monitoring the quantity of light from a backlight and a photodetector for monitoring the use environment. The present invention adopts mainly two means, one of which is the photodetector disposed behind the liquid crystal panel, not on the front thereof, for detecting the quantity of light from the backlight, and the other of which is the photodetector for monitoring the use environment.

The one of the two means is a photodetector with a polarizing plate mounted thereon in the liquid crystal display device, by which the quantity of light from the backlight can be monitored irrespective of whether the liquid crystal is transparent or nontransparent to light. Since the polarizing plate is interposed between the backlight and the liquid crystal, reflected light from the liquid crystal has a characteristic that its polarization greatly changes under the influence of the polarizing plate, depending on whether the liquid crystal is transparent to light or not. Accordingly, provision is made to monitor polarization components based on signal intensities detected by a photodetector with a polarizing plate having the same polarization characteristic as that of the above-mentioned polarizing plate and a photodetector having mounted thereon a polarizing plate whose direction of polarization is orthogonal to that of the above-mentioned polarizing plate.

The other means is an arrangement in which a photodetector or image sensor is disposed behind the liquid crystal panel, as viewed from the user side, for monitoring the user image or illuminance in the use environment through the liquid crystal panel by making it transparent to light. Further, in the liquid crystal display equipped with the backlight, since reflected light having a fixed polarized light component enters the photodetector or image sensor even when the liquid crystal is light-transparent, the influence of backlight can be lessened by the above-mentioned polarizing plate mounted on the photodetector or image sensor. Of course, it is also possible to control the intensity of backlight by the combined use of photodetectors or image sensors having mounted thereon polarizing plates whose directions of polarization are orthogonal to each other.

With above-mentioned means, it is possible, in a liquid crystal panel with a fixed quantity of backlight, to obtain an appropriate image in accordance with the working conditions of the liquid crystal panel (working temperature and aging characteristic). By applying a specific video signal (for example, a staircase image signal whose stairsteps are increased or decreased) with a manual photodetector held in close contact with the display screen and detecting the signal output from the photodetector, it is possible to obtain an optical transfer characteristic of the liquid crystal panel. By preparing a function for converting the video signal or conversion table on the basis of the optical transfer characteristic of the panel, the image intended to display can be reproduced.

BRIEF DESCRIPTION OF THE DRAWINGS

FIG. 2 is a block diagram of a liquid crystal display having built-in photodetectors according to a second embodiment of the present invention.

FIG. 3 is explanatory of the principles of the detection of quantity of light from a backlight and the detection of external light when different polarizing plates are used, A being the case where the backlight is OFF and B the case where the backlight is ON.

FIG. 4 is a block diagram of a liquid crystal display having a built-in photodetector according to a third embodiment of the present invention.

FIG. 8 is a block diagram of a conventional liquid crystal display having a built-in photodetector.

BEST MODE FOR CARRYING OUY THE INVENTION

A detailed description will hereinafter be given, with reference to the accompanying drawings, of embodiments of the present invention.

Embodiment 1

Figure 1:
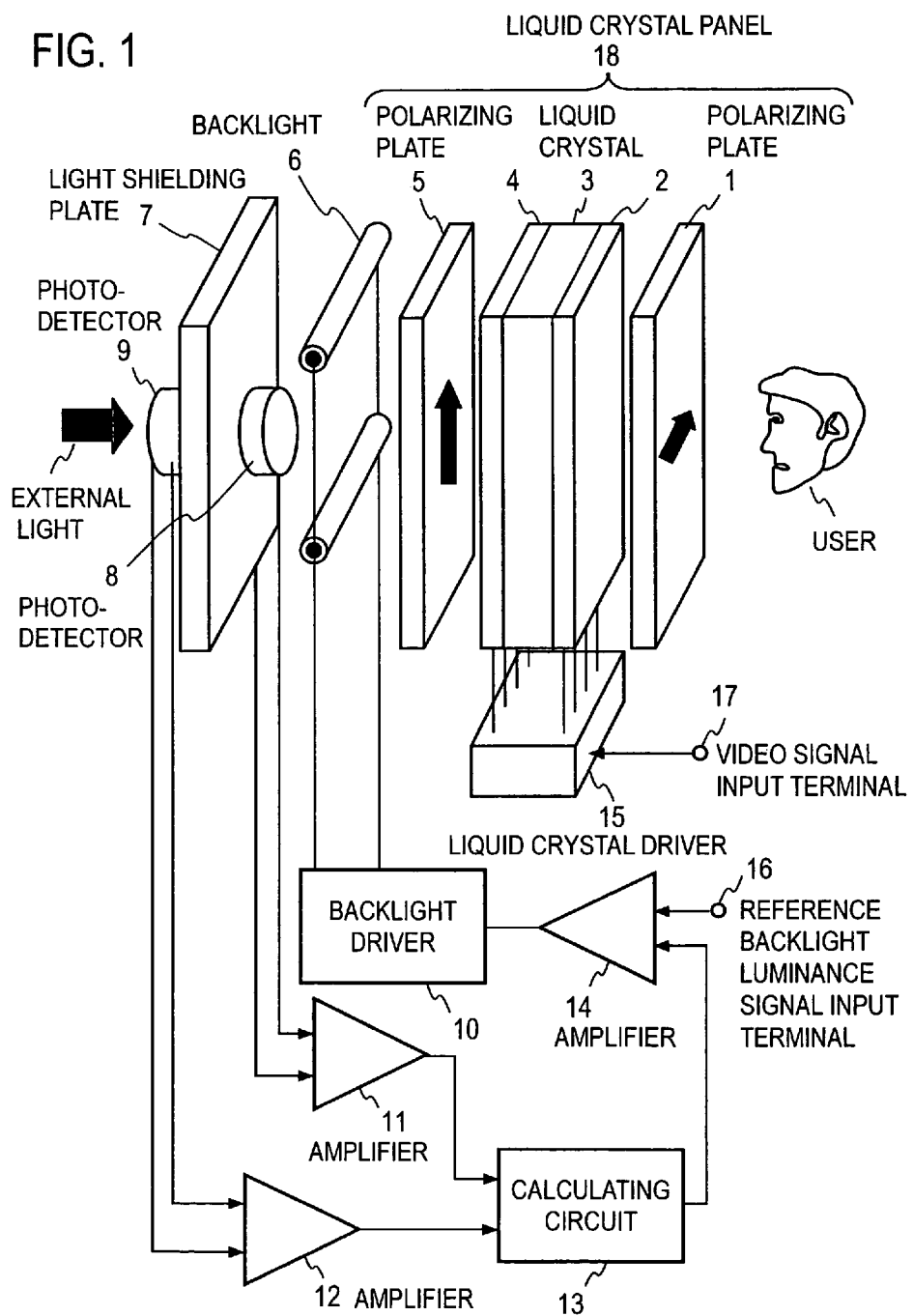
FIG. 1 is a block diagram of a liquid crystal display having built-in photodetectors according to a first embodiment of the present invention.

FIG. 1 is a block diagram of a liquid crystal display having built-in photodetectors according to a first embodiment of the present invention. Backlights 6 and a light shielding plate 7 are disposed behind a liquid crystal panel 18 wherein a liquid crystal layer 3 oriented and sandwiched between a transparent electrode plate 4 and a counter electrode plate 2 containing a TFT driver circuit is interposed between polarizing plates 1 and 5, and photodetectors 9 and 8 are placed on the outside and inside of the light shielding plate 7, respectively. Image information input via a video signal input terminal 17 is sent, as a drive signal corresponding to the voltage necessary for liquid crystal driving and the scanning scheme used, from a liquid crystal driver 15 to the transparent electrode plate 4 and the counter electrode plate 2 containing a TFT driver circuit. The liquid crystal used in this embodiment is one that has a property of rotating the plane of polarization of incident light through 90 degrees. The photodetectors are silicon PNP junction diodes.

A description will be made below of the principle of controlling the backlight in the above configuration. The photodetector 8 changes its output current with the quantity of light from the backlight. External light in the user environment is also incident on the photodetector 8 through the liquid crystal panel. The quantity of light in the user environment can be monitored indirectly by the photodetector 9 placed on the outside of the light shielding plate. Accordingly, output signals from amplifiers (which are current-voltage type transimpedance amplifiers), which are supplied with signals from the photodetectors, are applied to a calculating circuit 13, in which the component of the quantity-of-light signal of the user environment is multiplied by a coefficient and then subtracted from the quantity-of-light signal of the backlight, and from which the calculated output is input to an amplifier 14. The amplifier 14 detects the difference between the input thereto and the luminance of the backlight set by a reference backlight luminance signal fed to an input terminal 16 and applies a signal to a backlight driver 10 to adjust the power supply to the backlight to provide a desired quantity of light. While the signals in the above are described as being handled in analog form, it is needless to say that it is also possible to employ a configuration in which the output signals from the amplifiers 11 and 12 are AD converted so that the entire signal processing including the calculating circuit is performed in digital form.

Embodiment 2

FIG. 2 is a block diagram of a liquid crystal display having built-in photodetectors according to a second embodiment. Backlights 26 and a light shielding plate 27 are disposed behind a liquid crystal panel 220 wherein a liquid crystal layer 23 oriented and sandwiched between a transparent electrode plate 24 and a counter electrode plate 2 containing a TFT driver circuit is interposed between a polarizing plate 21 (of a horizontally polarizing characteristic) and a polarizing plate 25 (of a vertically polarizing characteristic), and photodetectors 28 and 29 are placed on the inside of the light shielding plate 218 in opposing relation to a polarizing plate 219 (of a vertically polarizing characteristic), respectively. Image information input via a video signal input terminal 217 is sent, as a drive signal corresponding to the voltage necessary for liquid crystal driving and the scanning scheme used, from a liquid crystal driver 215 to the transparent electrode plate 24 and the counter electrode plate 22 containing a TFT driver circuit. The liquid crystal used in this embodiment is a liquid (for instance, TN liquid crystal) that has a property of rotating the direction of polarization of incident light through 90 degrees. The photodetectors are silicon PN junction diodes.

A description will be made below of the procedure for controlling the backlight in the above configuration. The photodetectors 28 and 29 change their output currents with the quantity of light from the backlight. External light in the user environment is incident on the photodetector 29 through the liquid crystal panel since the polarizing plate 219 that has the same direction of polarization as that of the polarizing plate 25, but the external light is not incident on the photodetector 28 since the polarizing plate 218 disposed opposite thereto has the direction of polarization orthogonal to that of the polarizing plate 25. In this case, the quantity of light in the user environment can be directly monitored by calculating the output signals from the photodetectors 28 and 29. Accordingly, output signals from amplifiers (which are current-voltage type transimpedance amplifiers), which are supplied with signals from the photodetectors 28 and 29, respectively, are applied to a calculating circuit 213, in which the component of the quantity-of-light signal in the user environment is multiplied by a coefficient and then subtracted from the quantity-of-light signal of the backlight, and from which the calculated output is input to an amplifier 214. Since the coefficient is dependent on the transmittance of the polarizing plate and the nonlinear transmittance of the liquid crystal, it can be predetermined by experimental calibration. The amplifier 214 detects the difference between the input thereto and the luminance of the backlight set by a reference backlight luminance signal fed to an input terminal 216 and applies a signal to a backlight driver 210 to adjust the power supply to the backlight to provide a desired quantity of light. While the signals in the above are described as being handled in analog form, it is needless to say that it is also possible to employ a configuration in which the output signals from the amplifiers 11 and 12 are AD converted so that the entire signal processing including the calculating circuit is performed in digital form.

Figure 3A:
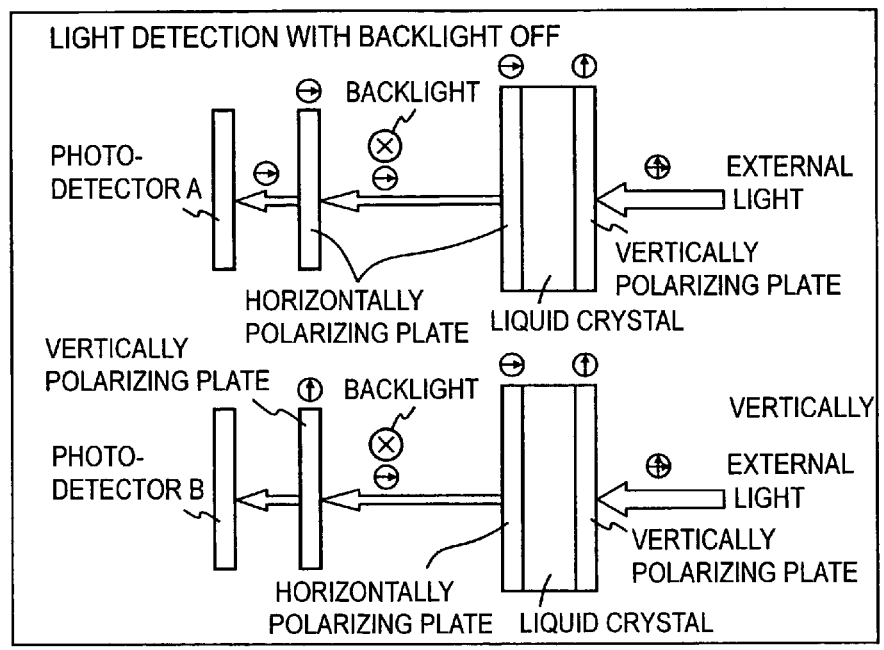

This principle will be described in more detail with reference FIG. 3. A description will be given first of the case where the back light is OFF (FIG. 3A). When the direction of polarization of the polarizing plate disposed behind the liquid crystal panel is horizontal, external light is horizontally polarized and can be transmitted through a photodetector A having mounted thereon a horizontally polarizing plate, but it cannot be transmitted through a photodetector B having mounted thereon a vertically polarizing plate. In this instance, the external light component is detected only by the photodetector A.

Figure 3B:
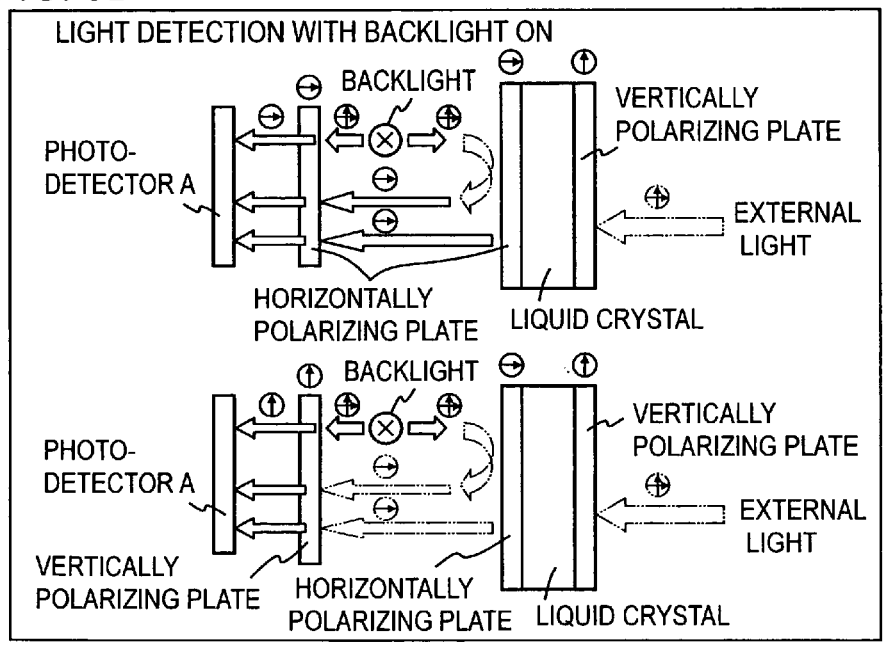

Next, a description will be given of the case where the backlight is ON (FIG. 3B). When the direction of polarization of the polarizing plate disposed behind the liquid crystal panel is horizontal, the quantity of light reflected from the liquid crystal panel varies according to the state of transmission therethrough, but the reflected component generally contains a large amount of horizontally polarized component. Such reflected light is transmitted through the photodetector A with the horizontally polarizing plate mounted thereon, but it is not transmitted through the photodetector B with the vertically polarizing plate thereon. In this case, the external light component is the same as in the case where the backlight is OFF. Accordingly, the quantity of light from the backlight can be monitored by the photodetector having mounted thereon the vertically polarizing plate without being affected by the reflected light and external light. The external light component can be obtained by detecting the difference between the outputs from the photodetectors A and B. For convenience of description of the backlight-control principle, the above refers to the use of the difference between the outputs from the photodetectors; needless to say, however, it is possible to provide for increased accuracy in the detection of the external light component by processing that rejects the quantity of light reflected from the liquid crystal to the backlight and multiplies the remaining signal component by a coefficient which is predetermined by the transmission coefficients of the polarizing plates and liquid crystal actually used. The viewability of the display image can also be enhanced by changing the quantity of light from the backlight based on the quantity of external light obtained as mentioned above.

Embodiment 3

FIG. 4 is a block diagram of a liquid crystal display having a built-in photodetector according to a third embodiment of the present invention. Backlights 46 and a light shielding plate 47 are disposed behind a liquid crystal panel 418 wherein a liquid crystal layer 43 oriented and sandwiched between a transparent electrode plate 44 and a counter electrode plate 42 containing a TFT driver circuit is interposed between a polarizing plate 41 (of a horizontally polarizing characteristic) and a polarizing plate 45 (of a vertically polarizing characteristic), and an image sensor 49 is placed on the light shielding plate behind a condenser lens 48. Image information input via a video signal input terminal 217 is sent, as a drive signal corresponding to the voltage necessary for liquid crystal driving and the scanning scheme used, from a liquid crystal driver 415 to the liquid crystal panel 418. The liquid crystal used in this embodiment is a liquid crystal that has a property of rotating the direction of polarization of incident light through 90 degrees. The image sensor is a silicon CCD or CMOS.

A description will be made below of the procedure of controlling the backlight in the above configuration. The image sensor 49 changes its output signal level in accordance with the quantity of light from the backlight. In this case, the quantity of external light in the user environment can be monitored directly through the liquid crystal panel. Accordingly, a video signal from the image sensor is input to a calculating circuit 413, from which a signal corresponding to the luminance of the video signal is provided to an amplifier 414. The content of such processing can be predetermined through experimental calibration, but it is also possible to obtain the image luminance signal by referring to a loop-up table which contains the quantity of light from the backlight and external light in the user environment. The amplifier 414 detects the difference between the input thereto and the luminance of the backlight set by a reference backlight luminance signal fed to an input terminal 416 and applies a signal to a backlight driver 410 to adjust the power supply to the backlight to provide a desired quantity of light. While the signals in the above are described as being handled in analog form, it is needless to say that it is also possible to employ a configuration in which signal processing by an image sensor control circuit 411 and the calculating circuit 413 is performed in digital form.

Figure 5:
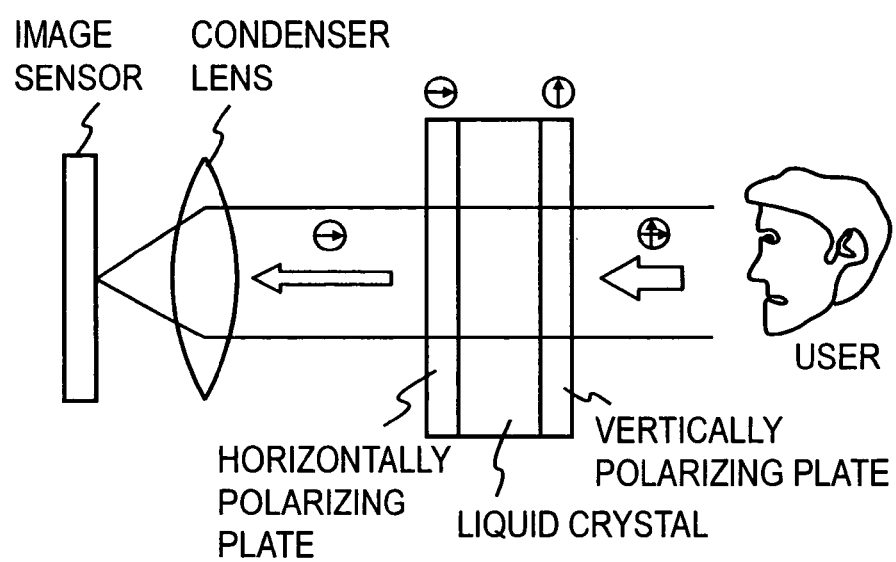
FIG. 5 is explanatory of the principle of capturing the image of a user by the image sensor in a fifth embodiment of the present invention.

Referring to FIG. 5, a description will be given of the principle of capturing the image of a user by the image sensor. When the backlight is OFF and the liquid crystal panel is fully transparent to light, the user image is focused by a condenser lens onto the image sensor, by which image information about the user can be detected. This can be done by intermittently operating the backlight or in the initial state of starting image display.

Embodiment 4

Figure 6:
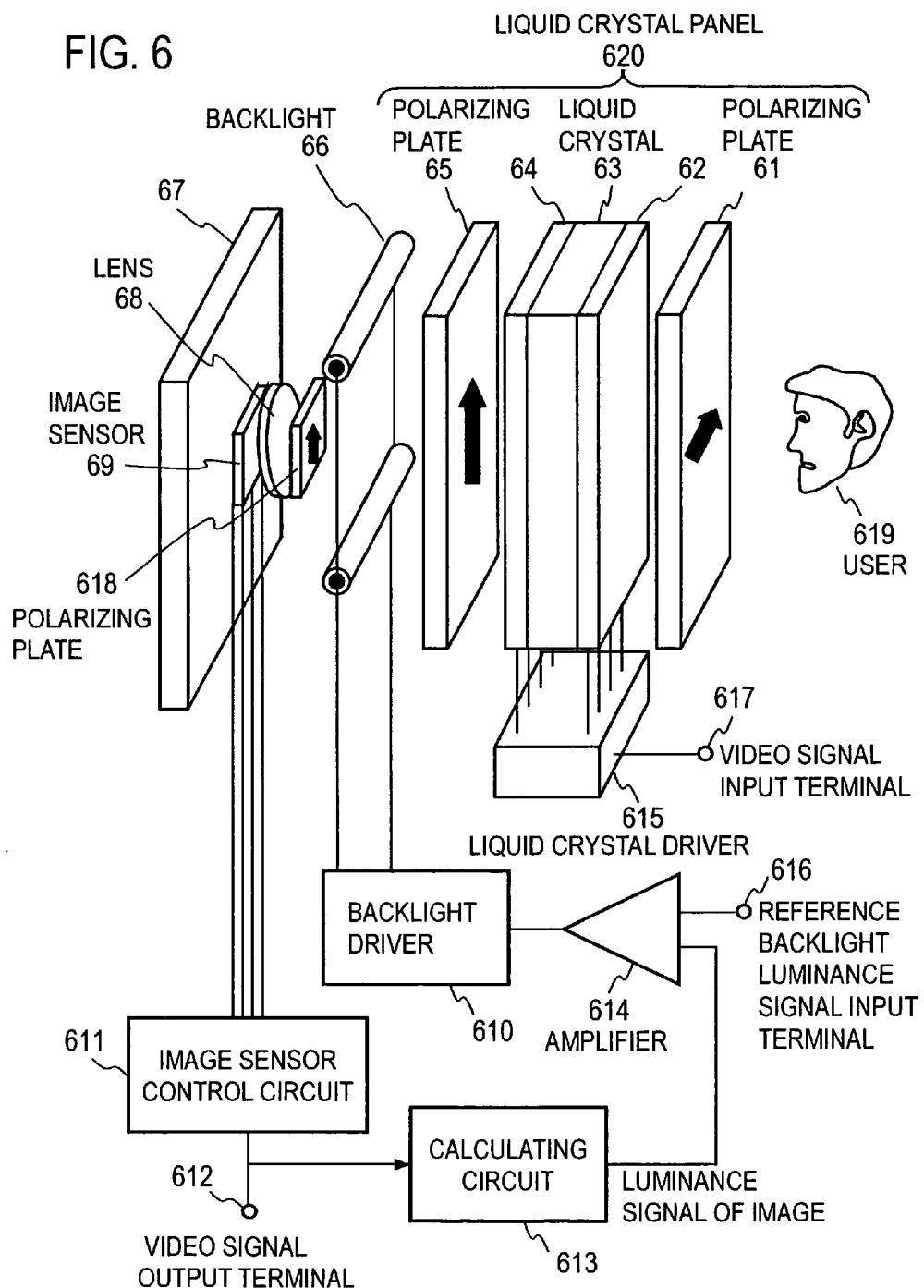
FIG. 6 is a block diagram of a liquid crystal display having a built-in photodetector according to a fourth embodiment of the present invention.

FIG. 6 is a block diagram of a liquid crystal display having a built-in photodetector according to a fourth embodiment of the present invention. Backlights 66 and a light shielding plate 67 are disposed behind a liquid crystal panel 618 wherein a liquid crystal layer 43 oriented and sandwiched between a transparent electrode plate 64 and a counter electrode plate 62 containing a TFT driver circuit is interposed between a polarizing plate 61 (of a horizontally polarizing characteristic) and a polarizing plate 65 (of a vertically polarizing characteristic), and an image sensor 69 is placed on the light shielding plate behind a condenser lens 68 and a polarizing plate 619. A video signal for display input via a video signal input terminal 617 is sent, as a drive signal corresponding to the voltage necessary for liquid crystal driving and the scanning scheme used, from a liquid crystal driver 615 to the liquid crystal panel 618. The liquid crystal used in this embodiment is a liquid crystal that has a property of rotating the direction of polarization of incident light through 90 degrees. The image sensor is a silicon CCD or CMOS.

A description will be made below of the procedure of controlling the backlight in the above configuration. The image sensor 69 changes its output signal level in accordance with the quantity of light from the backlight. In this case, the quantity of external light in the user environment can be monitored directly through the liquid crystal panel. Accordingly, a video signal from the image sensor is input to a calculating circuit 613, from which a signal corresponding to luminance of the video signal is provided to an amplifier 614. The content of such processing can be predetermined through experimental calibration, but it is also possible to obtain the image luminance signal by referring to a loop-up table which contains the quantity of light from the backlight and the external light in the use environment. The amplifier 614 detects the difference between the input thereto and the luminance of the backlight set by a reference backlight luminance signal fed to an input terminal 616 and applies a signal to a backlight driver 610 to adjust the power supply to the backlight to provide a desired quantity of light. While the signals in the above are described as being handled in analog form, it is needless to say that it is also possible to employ a configuration in which signal processing by an image sensor control circuit 611 and the calculating circuit 612 is performed in digital form.

Figure 7A:
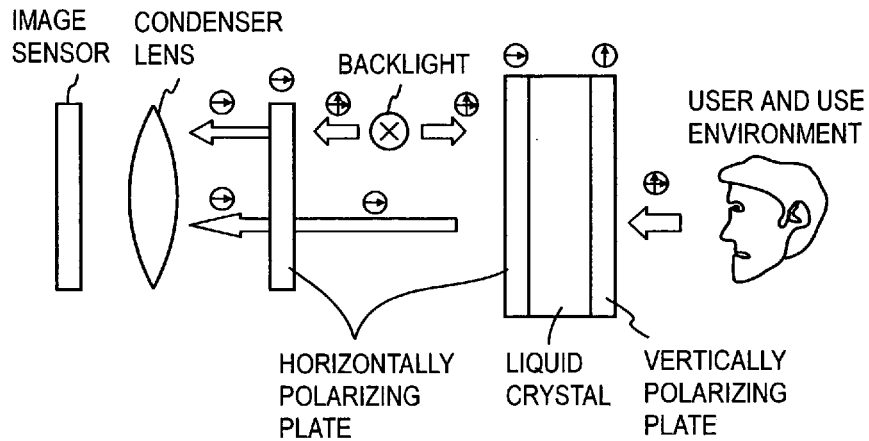
FIG. 7 is explanatory of the principles of capturing the image of a user by the image sensor when the backlight is ON in the fourth embodiment of the present invention, A being the case of using a horizontally polarizing plate and B the case of using a vertically polarizing plate.
Figure 7B:
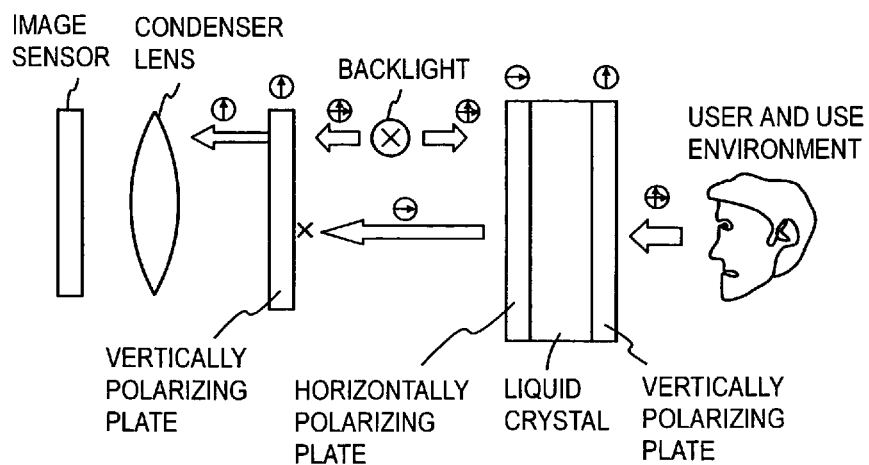

Referring to FIG. 7, a description will be given of the principle of capturing the image of a user by the image sensor when the backlight is ON. In this instance, two image sensors are prepared, on which a horizontally polarizing plate and a vertically polarizing plate are mounted, respectively. In the case of the image sensor having mounted thereon the horizontally polarizing plate, images of the user and user environment are focused by a condenser lens onto the image sensor as shown in FIG. 7A. In this instance, if the lens is focused on the user, then the backlight does not form its image. In the case of the image sensor having mounted thereon the vertically polarizing plate, backlight is similarly incident on the image sensor, but images of the user and use environment are not captured by the image sensor because the directions of polarization of the two polarizing plates are orthogonal to each other. The use of the latter permits detection of the quantity of light from the backlight without being affected by the external light. By detecting the difference between video signals available from the image sensors each having a different polarizing plate mounted thereon, the images of the user and use environment can be obtained without being affected by the backlight. By preparing two such image sensors or by preparing a liquid crystal panel configured to change the direction of polarization of the polarizing plate as by mechanical rotation, or a liquid crystal panel functioning also as a polarizing plate, it is possible to implement the above-mentioned function by one image sensor. For convenience of description of the user image capturing principle, the above refers to the use of the difference between the video signals available from the image sensors; needless to say, however, it is possible to provide for increased accuracy in the detection of the quantity of light from the backlight by processing of multiplying the image sensor output by a coefficient which is determined by the transmission coefficients of the polarizing plate and liquid crystal actually used.

Embodiment 5

Figure 9A:
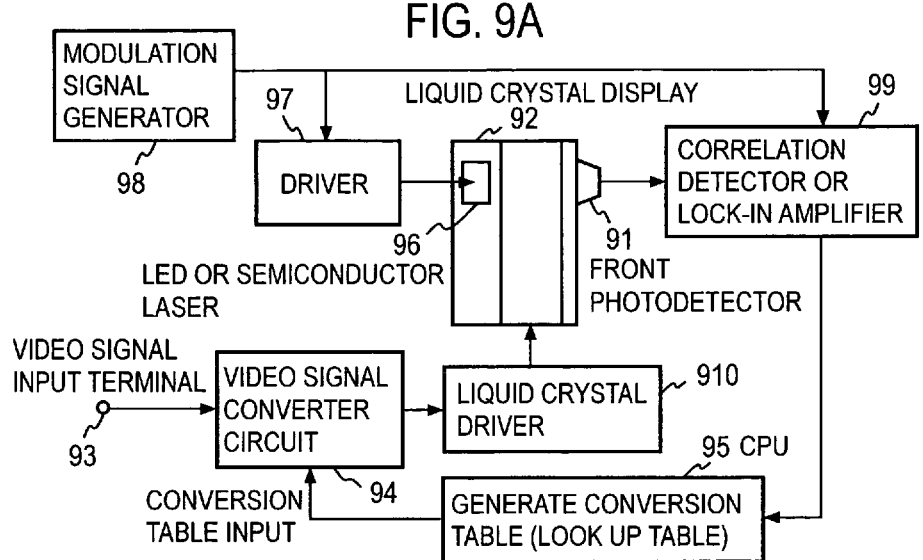
FIG. 9A is a block diagram for explaining a gray scale calibration method for a liquid crystal display by a photodetector disposed on its display screen, B is a diagram showing an input image signal, C is a diagram showing the light transmission characteristic of liquid crystal with respect to a staircase calibration signal, and D is a diagram showing, by way of example, the progression of repeated gray scale calibration.
Figure 9B:
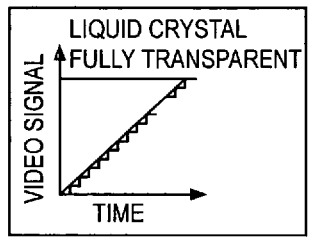

FIG. 9A shows a method for calibrating a video signal in the liquid crystal display of each of Embodiments 1, 2, 3 and 4 described above. A photodetector 91 is mounted on the front of a liquid crystal display 92, and a light emitting diode or semiconductor laser 96 is disposed on the back of the liquid crystal panel. The photodetector 91 is a silicon PN junction diode, and the light emitting diode 96 is an assembly of four RGBW (red, green, blue and white) light emitting diodes arranged side by side. A 12-bit staircase signal for calibration (see FIG. 9B) is input to a video signal input terminal 93. The time width of the stairstep is 1 millisecond. At first, the signal is input intact to a liquid crystal driver 910 without referring to a conversion table 95 described later on, thereby changing the state of transmission of the liquid crystal display.

A modulation signal generator 98 generates sine-wave signals of four different frequencies (for example, 100 KHz, 200 KHz, 300 KHz, and 400 KHz), or four orthogonal patterns of pseudo-random sequences (such, for example, as the following 16-bit sequences obtainable from the Hadamard matrix. Reference document: Yukitoshi Sanada, "CDMA by MATLAB/Simulink," Tokyo Denki Daigaku Press).

| 1 | 1 | -1 | -1 | -1 | -1 | 1 | 1 | 1 | 1 | -1 | -1 | -1 | -1 | 1 | 1 |
|---|---|---|---|---|---|---|---|---|---|---|---|---|---|---|---|
| 1 | -1 | -1 | 1 | -1 | 1 | 1 | -1 | 1 | -1 | -1 | 1 | -1 | 1 | 1 | -1 |
| 1 | 1 | 1 | 1 | 1 | 1 | 1 | 1 | -1 | -1 | -1 | -1 | -1 | -1 | -1 | -1 |
| 1 | -1 | 1 | -1 | 1 | -1 | 1 | -1 | -1 | 1 | -1 | 1 | -1 | 1 | -1 | 1 |

Figure 9C:
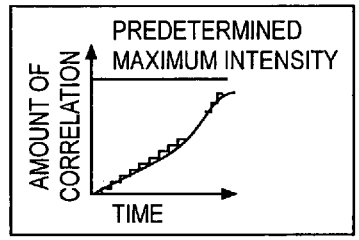
Figure 9D:
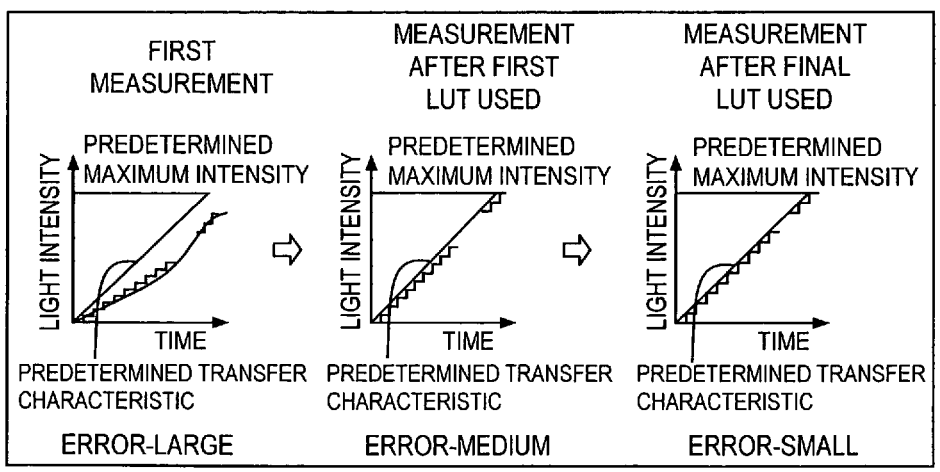

When product-sum operation is performed for these different sequences, the operation result is zero. In the case of the sine-wave signals of different frequencies, too, it is self-evident that when they are integrated for a period substantially equal to the minimum common multiplier of their cycle, the operation result is zero. That is, they all have a property that they are orthogonal to each other. Pulse modulation signals, which are on for 1 and off for −1, are produced and each assigned to one of four light emitting diodes. The time width of the minimum pulse is set to 1 microsecond. The modulation signals are each provided via a driver 97 to one of the light emitting diodes 96 to generate optical modulated signals. These optical modulated signals are detected by a photodetector 91 placed behind the liquid crystal panel. The output signal from the photodetector is input to a correlation detector 99. When the modulated signal is a sine wave, the correlation detector 99 can be regarded as a lock-in amplifier; by synchronizing the signal contained in the light emitted from each diode and the photodetector output at the same frequency, it is possible to detect the amplitude of each optical modulated signal without ambient noise. A description will be given of the operation of the correlation detector in the case where the modulated signals are pseudo-random sequences. A numerical value, obtained by A-D conversion of the photodetector output at a 10-MHz sampling frequency, and the pseudo-random sequence are correlated with each other. In this case, the correlation value is obtained, for example, by multiplying the pseudo-random sequence with 1 set at +1 and 0 at −1 (The Hadamard sequence may be held unchanged) by the above-mentioned numerical value A-D converted at the sampling frequency, and then accumulating the product for a time that is an integral multiple of the cycle of the pseudo-random sequence. Since the frequencies or pseudo-random sequences allotted to the four colors RGBW are orthogonal to each other, it is possible to calculate the transmission coefficient of the liquid crystal for each light emitting diode even if four color components of the optical modulated signal are measured at the same time. Such a procedure is repeated for each stairstep of the staircase video signal until its final stairstep is reached, by which the light transmission characteristic of the liquid crystal for the staircase calibration signal, such as shown in FIG. 9C, is obtained for each color. The distortion of the transfer curve in FIG. 9C is caused by the transfer characteristic of the liquid crystal that varies with temperature or the degree of deterioration. The output from the correlation detector is input to a CPU 95, wherein it is standardized with the predetermined maximum intensity and compared with the staircase video signal for calibration and a conversion table (LUT, Look Up Table) is created. The thus obtained conversion table is input to a video signal converting circuit 94 to generate a signal based on the first LUT. Thereafter, a 12-bit staircase calibration signal is input again to the video signal input terminal as shown in FIG. 9D to generate a signal based on a second LUT in the same manner as mentioned above. By repeating this, the transfer characteristic of the liquid crystal gradually approaches the predetermined transfer characteristic. The calibration terminates with the generation of a signal based on an LUT at the point in time when the error between the both transfer characteristics becomes minimum. The quantity of light from the backlight is also detected and ground noise become large; the detection accuracy can be increased by turning OFF the backlight, but according to this method, since the background component is cancelled at the time of detection of the correlation when the optical modulated signal is demodulated, the LUT can be generated even when the backlight is ON. While this method has been described as being applied to the calibration for each color, it is needless to say that the method is applicable to the calibration of a monochromatic display.

Embodiment 6

Figure 10A:
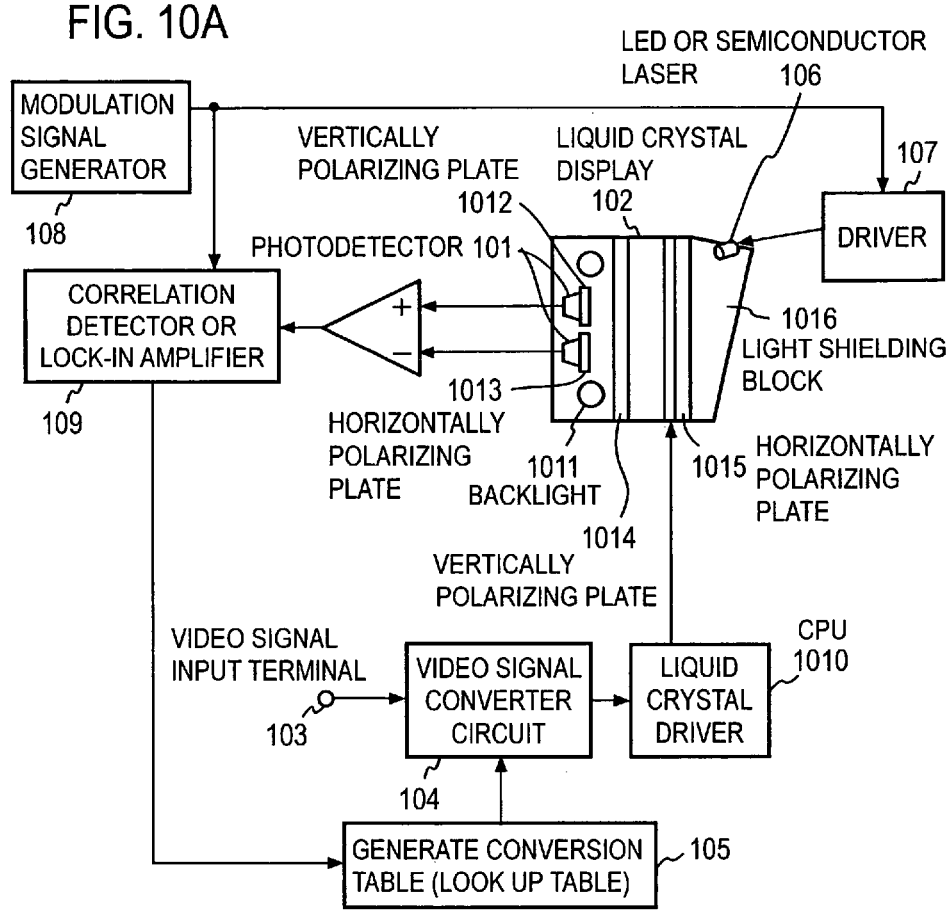
FIG. 10A is a block diagram for explaining a gray scale calibration method for a liquid crystal display by a light emitting diode disposed on its display screen, B is a diagram showing an input image signal, and C is a diagram showing the light transmission characteristic of liquid crystal with respect to a staircase calibration signal.
Figure 10B:
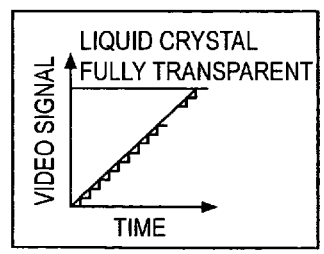

FIG. 10A shows a method of calibration of an image signal in the liquid crystal displays of Embodiments 1, 2, 3 and 4 described above. A light source 106 is disposed toward the display screen of a liquid crystal panel 102. The light source 106 is housed in a hood-like canopy provided for the purpose of shielding the liquid crystal panel from external light, and hence it does not obstruct the user's view. This embodiment uses semiconductors of three kinds of colors such as red, blue and green. Since the semiconductor laser is capable of emitting light of a fixed direction of polarization, the emitted light can be transmitted through the liquid crystal panel with extremely high efficiency by making the direction of polarization of the laser the same as that of the polarizing plate on the display screen to be irradiated with the laser light. Moreover, two photodetectors having mounted thereon polarizing plates of different directions of polarization are placed at the position of irradiation with the semiconductor laser. A 12-bit staircase calibration signal (see FIG. 10B) is input to a video signal input terminal 103. The time width of each stairstep is set to 1 millisecond. At first, the signal is input intact to the liquid crystal without referring to a conversion table described later on, thereby changing the state of transmission of the liquid crystal.

A modulation signal generator 98 generates sine-wave modulation signals of different frequencies (for example, 100 KHz, 200 KHz, and 300 KHz), or three patterns of pseudo-random sequences (such, for example, as the following 16-bit sequences obtainable from the Hadamard matrix).

| 1 | 1 | −1 | −1 | −1 | −1 | 1 | 1 | 1 | 1 | −1 | −1 | −1 | −1 | 1 | 1 |
| 1 | −1 | −1 | 1 | −1 | 1 | 1 | −1 | 1 | −1 | −1 | 1 | −1 | 1 | 1 | −1 |
| 1 | 1 | 1 | 1 | 1 | 1 | 1 | 1 | −1 | −1 | −1 | −1 | −1 | −1 | −1 | −1 |

Figure 10C:
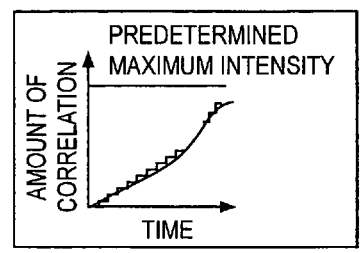

When a product-sum operation is performed for these different sequences, the operation result is zero. In the case of the sine-wave signals of different frequencies, too, it is self-evident that when they are integrated for a period substantially equal to the minimum common multiplier of their cycle. That is, they all have a property that they are orthogonal to each other. Pulse modulation signals, which are on for 1 and off for −1, are produced and each assigned to one of three light emitting diodes. The time width of the minimum pulse is set to 1 microsecond. The modulation signals are each provided via a driver 99 to one of the light emitting diodes 96 to generate optical modulated signals. The optical modulated signals are detected by the photodetectors 101 for backlight illuminance detection use described previously in Embodiment 2. As described in Embodiment 2, the difference between output signals from the two photodetectors is detected by a differential amplifier, by which it is possible to cancel the main component of backlight and measure the component of the semiconductor laser light. The output signal from the differential amplifier is applied to a correlation detector 109. When the modulation signals are sine-wave, the correlation detector 109 can be regarded as a lock-in amplifier; by synchronizing the signal contained in the light emitted from each diode and the photodetector output at the same frequency, it is possible to detect each optical modulation signal while canceling the noise input to each photodetector. A description will be given of the operation of the correlation detector in the case where the modulated signals are pseudo-random sequences. A numerical value, obtained by A-D conversion of the photodetector output at a 10-MHz sampling frequency, and the pseudo-random sequence are correlated with each other. In this case, the correlation value is obtained, for example, by multiplying the pseudo-random sequence with 1 set at +1 and 0 at −1 (The Hadamard sequence may be held unchanged) by the above-mentioned numerical value A-D converted at the sampling frequency, and then accumulating the product for a time that is an integral multiple of the cycle of the pseudo-random sequence. Since the frequencies or pseudo-random sequences allotted to the four colors RGB are orthogonal to each other, it is possible to calculate the transmission coefficient of the liquid crystal for each light emitting diode even if the transmission coefficients for three color components of the optical modulated signal are measured at the same time. Such a procedure is repeated for each stairstep of the staircase video signal until its final stairstep is reached, by which the light transmission characteristic of the liquid crystal for the staircase calibration signal, such as shown in FIG. 10C, is obtained for each color. The distortion of the transfer curve in FIG. 10C is caused by the transfer characteristic of the liquid crystal that varies with temperature or the degree of deterioration. The output from the correlation detector is input to a CPU 105, wherein it is standardized with the predetermined maximum intensity and compared with the staircase video signal for calibration and a conversion table (LUT, Look Up Table) is created. The thus obtained conversion table is input to a video signal converting circuit 94 to generate a signal based on the first LUT. Thereafter, as described with reference to FIG. 9, (A 12-bit staircase calibration signal is input again to the video signal input terminal to generate a signal based on a second LUT and a signal based on the second LUT in the same manner as shown in FIG. 9D. By repeating this, the transfer characteristic of the liquid crystal gradually approaches the predetermined transfer characteristic) the calibration terminates with the generation of a signal based on an LUT at the point in time when the error between the both transfer characteristics becomes minimum. The quantity of light from the backlight is also detected by the photodetector and ground noise become large; the detection accuracy can be increased by turning OFF the backlight, but according to this method, since the background component is cancelled at the time of detection of the correlation when the optical modulated signal is demodulated, the LUT can be generated even when the backlight is ON. While this method has been described as being applied to the calibration for each color, it is needless to say that the method is applicable to the calibration of a monochromatic display. Since the photodetector also detects the quantity of light in the use environment, the background noise become large, but according to this method, since the background noise component is cancelled at the time of detection of correlation, the LUT can be generated in whatsoever working condition. While this method has been described as being applied to the calibration for each color, it is needless to say that the method is applicable to the calibration of a monochromatic display. Further, semiconductor lasers are used as the light emitting source 106 but light emitting diodes can similarly be used. While in the above the light source has been described as being housed in a hood-like canopy provided for the purpose of shielding the liquid crystal panel from external light, it is needless to say that a movable light source array can be mounted on the liquid crystal display screen for calibration.

With the use of the present invention, it is possible to exclude the influence of external light in the use environment on the photodetector for detecting the quantity of light form the backlight, permitting high-accuracy backlight control. An image sensor, which is a kind of photodetector, can be disposed behind the liquid crystal panel to capture image information about the user. In either case, by processing a plurality of signals from photodetectors or image sensors having mounted thereon polarizing plates of different directions of polarization with a view to utilizing the property of polarized light that is transmitted through the liquid crystal panel, it is possible to provide increased accuracy in the backlight control and in capturing the user image. Besides, stabilization of backlight by the present invention permits high accuracy calibration—this is of great industrial value when employed in a liquid crystal display for medical care that is required to have high-level gray scale and high degree of reproducibility and high precision/high-level-gray-scale liquid crystal display for design use.

The invention claimed is:

1. A liquid crystal display, wherein the quantity of light from a backlight is controlled on the basis of a signal obtained by calculating two or more signals that are detected by two photodetectors whose ratio of incident light from said backlight and an external source are different, and wherein said two photodetectors are disposed behind a liquid crystal panel, the photodetectors each having mounted thereon one of polarizing plates whose directions of polarization are identical with and orthogonal to the direction of polarization of a polarizing plate placed on the side of a backlight with respect to liquid crystal.

2. The liquid crystal display recited in claim 1, wherein the quantity of light from the backlight is controlled on the basis of ambient illuminance and the light intensity of the backlight detected by said photodetector or image sensor from the quantity of light transmitted from the liquid crystal display panel and the quantity of light reflected from the back of the liquid crystal panel.

3. A calibration method for the liquid crystal display recited in claim 1, wherein a second light source and a second photodetector are disposed behind the liquid crystal panel and on the display screen of the liquid crystal panel, respectively; when a calibrating image signal is input to the liquid crystal display, said second light source is modulated; light transmitted through liquid crystal is detected by the second photodetector; the modulated signal is demodulated to obtain the optical transfer characteristic of the liquid crystal; and a conversion function or conversion table of the calibrating image signal is obtained for calibration of the image display.

4. A calibration method for the liquid crystal display recited in claim 1, wherein a third light source formed by a light emitting diode or semiconductor laser is disposed on the display screen of the liquid crystal panel and directed toward the display screen, the light emitting diode or semiconductor laser emitting light polarized in the same direction as the direction of polarization of the liquid crystal panel; when a calibrating image signal is input to the liquid crystal display, the light source is modulated; the modulated signal detected by a photodetector or image sensor disposed behind the liquid crystal panel is demodulated to obtain the optical transfer characteristic of the liquid crystal; and a conversion function or conversion table of the calibrating image signal is obtained for calibration of the image display.

* * * * *